United States Patent [19]

Nishikawa et al.

[11] Patent Number: 4,513,638
[45] Date of Patent: Apr. 30, 1985

[54] CONTROL MECHANISM FOR SELECTIVE CREEP OF AN AUTOMATIC TRANSMISSION

[75] Inventors: Masao Nishikawa, Tokyo; Torao Hattori; Takashi Aoki, both of Wako; Hiroshi Yoshizawa, Kamifukuoka, all of Japan

[73] Assignee: Honda Giken Kogyo Kabushiki Kaisha, Tokyo, Japan

[21] Appl. No.: 364,027

[22] Filed: Mar. 31, 1982

[30] Foreign Application Priority Data

Apr. 4, 1981 [JP] Japan .................................. 56-50818

[51] Int. Cl.³ .................... B60K 41/18; B60K 41/16
[52] U.S. Cl. ........................................ 74/866; 74/877; 192/0.052; 192/0.092; 192/3.58
[58] Field of Search ................ 192/0.052, 0.092, 3.58, 192/0.076, 103 R; 74/856, 861, 866, 877, 752 A, 752 C, 857

[56] References Cited

U.S. PATENT DOCUMENTS

| | | | |
|---|---|---|---|
| 2,566,518 | 9/1951 | Farkas | 74/867 X |
| 2,575,277 | 11/1951 | Johnson | 192/0.08 |
| 2,575,901 | 11/1951 | Wheeler | 192/0.08 X |
| 2,924,995 | 2/1960 | Hubert et al. | 74/745 |
| 2,953,940 | 9/1960 | Slemmons | 74/867 X |
| 2,992,565 | 7/1961 | Hansen et al. | 74/365 X |
| 3,438,285 | 4/1969 | Hanzi et al. | |
| 3,707,892 | 2/1973 | Kuroda et al. | |
| 3,868,869 | 3/1975 | Hunt et al. | 74/752 A X |
| 3,890,856 | 6/1975 | Miyauchi et al. | 74/752 C X |
| 4,046,032 | 9/1977 | Braun et al. | 74/877 X |
| 4,194,608 | 3/1980 | Usui et al. | 192/0.092 |
| 4,373,409 | 2/1983 | Benedek et al. | 74/745 |

FOREIGN PATENT DOCUMENTS 54-139171  9/1979  Japan.
55-63046   5/1980  Japan ................................. 74/867

*Primary Examiner*—George H. Krizmanich
*Assistant Examiner*—Dirk Wright
*Attorney, Agent, or Firm*—Armstrong, Nikaido, Marmelstein & Kubovcik

[57] ABSTRACT

A control mechanism for a transmission of a vehicle having an internal combustion engine. The transmission includes a torque convertor, a coupling member, a gear-train, and an operation lever having a neutral position and at least three other positions. The torque convertor, the gear-train, and the coupling member are interposed in a system line for transmitting output torque of the engine to a driving wheel of the vehicle. The operation lever is arranged to operate the coupling member to connect the torque convertor to the gear-train by being moved from the neutral position to one of the other positions. The control mechanism includes a coupling-preventing mechanism operatively associated with the coupling member for preventing coupling when a throttle valve of the engine is in an idling position and the operation lever is moved from the neutral position to one of the other positions. The control mechanism also includes a change-over mechanism associated with the coupling-preventing mechanism for selectively changing-over the coupling-preventing mechanism from an operative state preventing coupling to a rest state permitting coupling whereupon the coupling member connects the torque convertor to the gear-train even though the throttle valve is in an idling position.

6 Claims, 4 Drawing Figures

CONTROL MECHANISM FOR SELECTIVE CREEP OF AN AUTOMATIC TRANSMISSION

This invention relates to a control mechanism for a fully automatic or semi-automatic transmission for a vehicle. Such transmissions generally have a torque convertor and a transmission geartrain with a coupling member therein arranged to be operated by a control lever to couple the geartrain to the torque convertor by switching the lever from a neutral position to one of a number of other positions. The coupling member transmits an output torque of an internal combustion engine to the driving wheels of the vehicle.

With a transmission of this kind, generally the output torque of the engine, during operation thereof, is always transmitted to the torque convertor. When the engine is idling and the operation lever is moved from the neutral position thereof to one of the other positions, phenomenon known as "creep" occurs in that the output torque is transmitted to the driving wheels and the vehicle starts moving. The load on the engine caused by creep becomes a considerable burden to the engine when it is normally idling. As a result of the load, the engine r.p.m. decreases by about 200 r.p.m. lower than the idling rotation speed when the operation lever is in its neutral position. This causes the following problems:

The first problem is that, since it is very difficult to set a resonance point of an engine mount as not to generate individual resonances at both the above-mentioned two different idling rotation speeds, it has been usual that the resonance point is so set as to correspond to the idling speed at the neutral position which is the speed that is most frequently used. Thus, the changeover operation of the control lever from the neutral position often generates sound reverberations and vibrations of the vehicle body.

The second problem is that the degree of openness of the throttle valve at idle has to be set large enough that the idling rotation speed of the engine under the changed over condition of the control lever from its neutral position may be kept at the lowest permissible rotation speed against increase in a load caused by creep. This lowest permissible speed is determined by the necessity for maintaining a charge and discharge balance in an electric system and/or other reasons. As a result, the idling rotation speed at the neutral position is unduly increased, thus resulting in unfavorable fuel economy.

For eliminating those problems, Japanese Unexamined Utility Model Publication No. Sho 54(1979)-139171 presents an arrangement wherein a coupling-preventing mechanism is arranged to be operated when a throttle valve is at its idle position so that the coupling member, such as an oil pressure operated clutch or the like provided in the transmission mechanism is prevented from coupling the torque convertor and the geartrain even by changing over operation of the operation lever from its neutral position. By this arrangement, generation of creep caused by a power transmission to the driving wheels during the engine idling can be prevented, and the foregoing problems are eliminated.

However, creep has not only the disadvantage discussed above on one hand, but also has an advantage on the other. For example, creep can be used advantageously, for instance, when starting the vehicle on a slope or when moving the vehicle a little so as to shorten the distance from the preceeding vehicle especially in the case of traffic congestion. Accordingly, it is desirable that creep should not be eliminated totally, but should be taken advantage of as an occasion demands.

OBJECTS AND SUMMARY OF THE INVENTION

It is an object of the present invention to provide a control mechanism for a transmission of a vehicle so that in certain conditions creep can be advantageously utilized.

It is a further object to provide a control mechanism that eliminates creep in certain other conditions.

It is yet another object to provide a control mechanism arranged so that a driver of the motor vehicle can select whether or not creep is to be used.

It is still another object to provide a control mechanism whereby if creep is selected to be used, the idling speed of the engine is advanced by a predetermined amount to maintain desirable functions of the engine.

These and objects are attained in a control mechanism for a transmission of a vehicle having an internal combustion engine wherein:

The transmission includes a torque convertor, a coupling member, a geartrain, and an operation lever. The operation lever has a neutral position and at least three other positions. These other positions are usually R-reverse drive, L-low speed forward drive, D-normal forward drive, and P-park. The torque convertor, the geartrain, and the coupling member are interposed in a system line for transmitting output torque of the engine to a driving wheel of the vehicle. The operation lever is arranged to operate the coupling member to connect the torque convertor to the geartrain by being moved from the neutral position to one of the other positions. The control mechanism includes a coupling-preventing means operatively associated with the coupling member for preventing coupling when a throttle valve of the engine is in an idling position and the operation lever is moved from the neutral position to one of the other positions. Further, the control mechanism includes a change-over means associated with the coupling-preventing means for selectively changing-over the coupling-preventing means from an operative state preventing coupling to a rest state permitting coupling whereupon the coupling member connects the torque convertor to the geartrain even though the throttle valve is in an idling position.

The change-over means can be operatively associated with the operation lever at least one selected position of the three other positions. In this manner, movement of the operation lever from the neutral position to at least one selected position changes over the coupling preventing means to the rest state even though the throttle valve is in the idling position. The changeover means can be operatively associated with the operation lever at two selected positions of the three other positions.

The control mechanism can further comprise means operative when the changeover means changes over the coupling-preventing means to the rest state for opening the throttle a predetermined amount from the idling position.

In certain instances, the coupling member is operated by a predetermined minimum of hydraulic pressure. The coupling preventing means can include an electrical power source, means for generating a signal when the throttle valve is in the idling position, solenoid means for reducing the hydraulic pressure to the coupling member below the predetermined minimum, and contact means electrically connecting the power source to the solenoid means when said generating means produces a signal. The changeover means can comprise a switch having two positions electrically interposed between the contact means and the solenoid means and operatively connected to the operation lever. One of the switch positions electrically connects the contact means to the solenoid means to establish the operative state of the coupling-preventing means. The other switch position disconnects the contact means and the solenoid means to establish the rest state of the coupling-preventing means.

The means for opening the throttle valve can comprise vacuum-operated means mechanically linked to the throttle valve for opening the throttle valve the predetermined amount, valve means connected between a source of vacuum and the vacuum-operated means for applying vacuum to open the throttle valve, solenoid means connected to the valve means for operating the valve means upon being connected to a source of electrical power, and electrical connection means between the solenoid means and the other position of the switch. In this manner when the switch is in the other position, the solenoid means operates the valve means applying vacuum to the means for opening the throttle valve the predetermined amount.

DETAILED DESCRIPTION OF A PREFERRED EMBODIMENT

Figure 1:
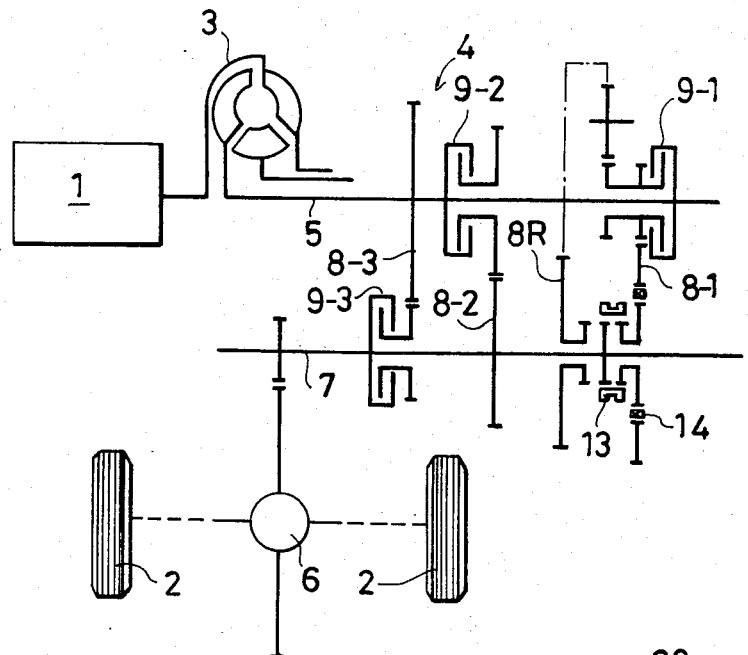
FIG. 1 is a diagram showing one example of a transmission apparatus to which this invention is applied.

Now embodying examples of the present invention will be explained with reference to the accompanying drawings. Referring to the drawings, an internal combustion engine 1 is interconnected to driving wheels 2 of a vehicle through a power transmission system line incorporating therein a torque convertor 3 and a transmission mechanism 4. The transmission mechanism 4 comprises respective gear trains 8-1, 8-2, 8-3, 8-R for three forward stages and one reverse stage, which are provided between an input shaft 5 connected to the torque convertor 3 and an output shaft 7 which is connected through a differential gear 6 to the driving wheels 2. A first speed oil pressure operated clutch 9-1 provided on the input shaft 5 and serves as a coupling member is interposed in the first speed gear train 8-1. A second speed oil pressure operated clutch 9-2 provided on the input shaft 5 is interposed in the second speed gear train 8-2. A third speed oil pressure operated clutch 9-3 provided on the output shaft 7 is interposed in the third speed gear train 8-3. These oil pressure operated clutches 9-1, 9-2, 9-3 are arranged to be selectively supplied with hydraulic pressure from an oil pressure source 12 through an oil pressure control means 11 having a manual valve or the like arranged to be moved with an operation lever 10. In this manner, the vehicle can move at a speed selected from first to third speeds by the coupling of these oil pressure operated clutches 9-1, 9-2, 9-3.

Further, the reverse gear train 8-R uses in common the first speed oil pressure operated clutch 9-1 as a coupling member. The first speed gear train 8-1 and the reverse gear train 8-R are arranged so that either one thereof may be selectively established by a selector gear 13 arranged to be controlled in operation by the oil pressure control means 11. Additionally, a one-way clutch 14 for permitting an over-rotation of the output shaft 7 side is interposed in the first speed gear train 8-1, so that a smooth change speed from the first speed to the second speed can be obtained. The control lever 10 is so designed that it may be changed over freely to select any desired one of five different positions comprising, for example a N range for a neutral position, a D range for an automatic speed-change, an L range for a low-speed, a R range for a reverse running, and a P range for parking.

When control lever 10 is in the N or P range, pressure oil supply to the respective oil pressure operated clutches, 9-1, 9-2 and 9-3 is blocked. When the same is in the D range, the hydraulic pressure is supplied in order to each of the respective oil pressure operated clutches 9-1, 9-2 and 9-3 according to the positions of the shift valve means changed over by the vehicle speed and the degree of opening of throttle valve. Thus, any selected automatic speed-change controlled running at from the first to third speed is permitted. When the same is in the L range, the shift valve means is prevented from being moved to the position for establishing the 3rd speed and the hydraulic pressure supply to the third speed clutch 9-3 is blocked so that a low-speed running at the first or second speed only is permitted. When the same is in the R range, the hydraulic pressure is supplied to the first speed clutch 9-1 and the selector gear 13 is shifted to the backward driving vehicle side so that there is effected a reverse driving.

As for the oil pressure control means 11, various kinds thereof have been proposed so far, but the construction thereof is not concerned in the present invention, and therefore any further detailed explanation thereof is omitted herein.

The first speed oil pressure operated clutch 9-1 which is to be operated to couple when pressure oil is supplied thereto by changing over of the control lever 10 from the N range to any of the D, L and R ranges, is so arranged that, at a specific range selected therefrom, the coupling during the engine idling operation can be prevented by means of a coupling-preventing means or mechanism 16 which operates in the condition that the throttle valve is in its idle position.

To describe this more in detail, the coupling-preventing mechanism 16 comprises a valve mechanism 19 interposed in a drain passage 18 connecting between the first speed oil pressure operated clutch 9-1 and a tank 17, an electromagnetic solenoid 20 which operates to open and close the valve mechanism 19, and a control circuit 21 for controlling the electric current supply to the solenoid 20. The control circuit 21 comprises an idle detector 23 or means which generates an output signal when the throttle valve 15 is located at its idling position in accordance with displacement of a throttle pedal 22, a vehicle stop detector 25 which move with a speed meter 24 and generates an output signal when the vehicle is stopped (more precisely, when the vehicle speed is at such an extremely low one as 10 km/h or less because it is difficult to actually detect the vehicle stop alone), an AND circuit 26 which receives the output signals from the two detectors 23 and 25, and a switching element 27 provided on the output side of the AND circuit. In this manner, when the engine is idling and the vehicle is stopped (during which the output signals from both of said detectors 23 and 25 are emitted), the switching element 27 is closed, and consequently the electromagnetic solenoid 20 is connected to a battery 28 whereupon the valve mechanism 19 is energized by an electric current flowing thereto. Thus, the valve mechanism 19 is opened, permitting the hydraulic pressure oil to drain off into the drain passage 18, whereby coupling of the first speed oil pressure operated clutch 9-1 is prevented.

The vehicle stop detector 25 is provided lest the first speed oil pressure operated clutch 9-1 should be released from coupling when the throttle pedal 22 is returned to an idle position for obtaining an engine brake operation during the moving of the vehicle. When a one-way clutch 14 is interposed in the first speed gear train 8-1 as in the transmission mechanism 4 shown in FIG. 1, the engine brake naturally does not work, so that, in this case, the vehicle stop detector 25 may be omitted. It is enough with that the switching element 27 is opened and closed only by the presence or absence of the output signal from the idle detector 23.

Although in the illustrated embodiment, the drain passage 18 branches off from an oil supply passage 11a provided on the outlet side of the oil pressure control means 11 connected to the first speed oil pressure operated clutch 9-1, the same is not limited thereto, and may be so modified, for example, to branch off from the inlet side of the oil pressure control apparatus 11 connected to the oil pressure source 12.

Figure 2:
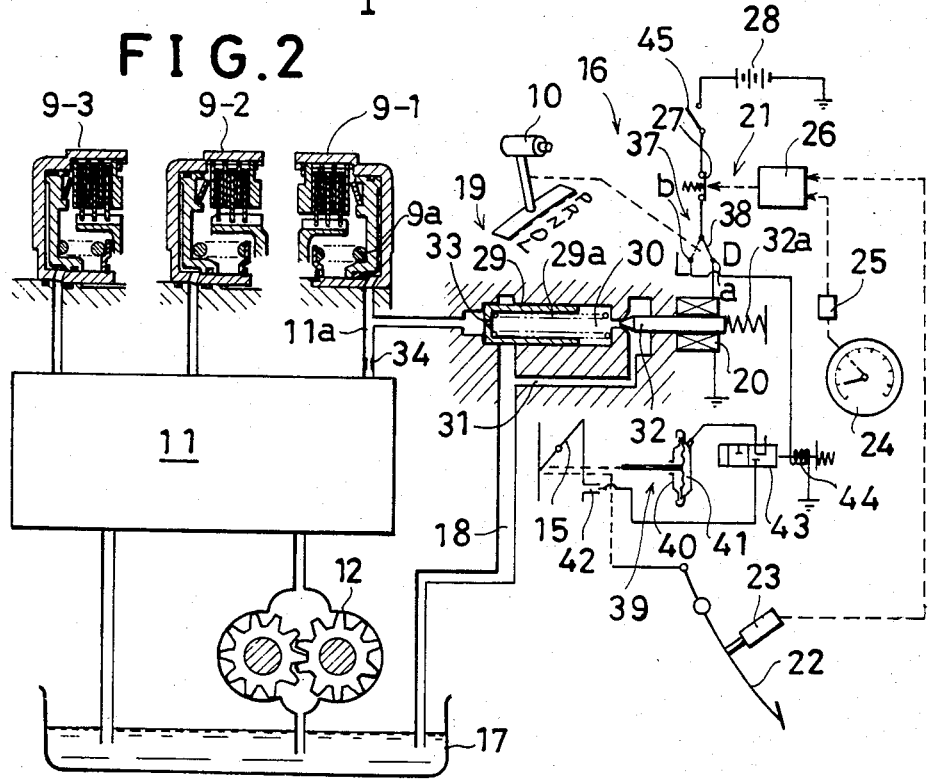
FIG. 2 is a systematic diagram showing one embodying example of this invention.
Figure 3:
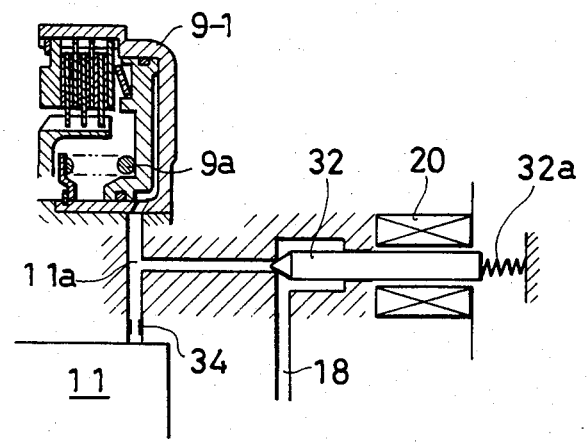
FIGS. 3 and 4 are diagrams showing respectively modified examples of this invention.
Figure 4:
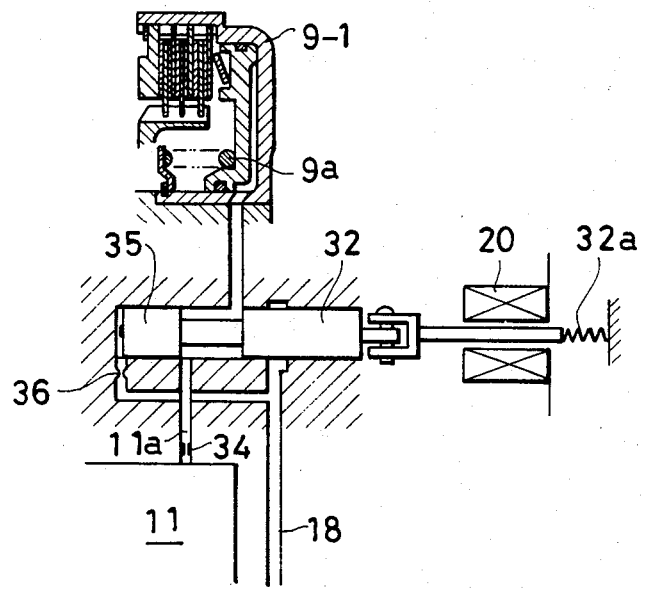

Furthermore, the valve mechanism 19 interposed in the drain passage 18 may be also constructed as shown in FIGS. 2 to 4. More in detail, one modified example is, for instance, as shown in FIG. 2. Namely, the valve mechanism 19 shown in FIG. 2 consists of a relief valve 29 interposed in the drain passage 18 and a control valve 32 interposed in a by-pass 31 connecting between a pressure receiving chamber 30 located behind the relief valve 29 and the downstream side of the drain passage 18. The control valve 32 is arranged to be moved with the foregoing electromagnetic solenoid 20. The pressure-receiving chamber 30 is connected, through an orifice 33 made in the relief valve 29, to the upstream side of the drain passage 18. In this manner, when the control valve 32 is moved to open against the action of a spring 32a by the energization of the electromagnetic solenoid 20, the pressure oil is allowed to flow from the upstream side of the drain passage 18 to the by-pass 31 through the orifice 33. The relief valve 29 is then pushed backward to open against the action of the spring 29a due to a pressure difference between the oil pressure of said upstream side and that in the pressure-receiving chamber 30. The oil pressure in the upstream side, that is, the oil pressure in the first speed clutch 9-1, is lowered to a predetermined set pressure level predetermined by the force of the spring 29a. The set pressure level is so low as about 0.5 kg/cm² for example. This is not so high as to cause the first speed clutch 9-1 to couple against the force of the return spring 9a built therein.

When the electric current supply to the electromagnetic solenoid 20 is cut off, the control valve 32 is closed by the spring 32a and the relief valve 29 is pushed to move to the closing side by the force of the spring 29a. And, in this case, the moving speed thereof is comparatively slow due to the viscous resistance of the oil flowing through the orifice 33, so that the supply oil pressure to the first speed clutch 9-1 is gradually increased. Thus, a smooth coupling thereof results and, thus no shock is brought about at the time of starting of the vehicle.

Referring to the drawings, an orifice 34 is interposed in the oil supply passage 11a. This orifice 34 when the drain passage 18 is opened, prevents the delivery pressure of the oil pressure source to be so lowered that the torque convertor 3 cannot be filled fully with the oil. It also serves to provide, in its cooperation with the foregoing slow closing movement of the relief valve 29, a shock absorbing effect when the first speed clutch 9-1 is coupled.

In addition, the valve mechanism 19 may be constructed without the relief valve 29. Instead the control valve 32 is directly interposed in the drain passage 18 as shown in FIG. 3 or an auxiliary control valve 35 which is to close the oil supply passage 11a when the control valve 32 is opened is formed into a construction united with the control valve 32 as shown in FIG. 4. This prevents a possible delivery pressure drop of the oil pressure source 12 that could otherwise occur when the drain passage 18 is opened. Referring to FIG. 4, another orifice 36 can be provided to take advantage of the viscous resistance of the oil which is being pushed out into the drain passage 18 by the auxiliary control valve 35. This causes the moving speed of the control valve 32 to be slower when the valve 32 is being moved toward its closing.

The coupling-preventing mechanism 16 has been explained as above, and according to this invention the mechanism 16 is equipped with a change-over mechanism or means 37 which is operable at the driver's seat, so that the coupling-preventing mechanism 16 may be changed over by the change-over mechanism 37 from its normal state, in which it is operative, to its rest state in which it is inoperative.

The change-over mechanism 37 can comprise, for example, a change-over switch 38 which is interposed in series with the aforementioned switching element 27 in a circuit connecting between the electromagnetic solenoid 20 and the battery 28. The switch 38 is arranged to be moved with, for example, the operation lever 10, so that when the operation lever 10 is changed over to its L range, the switch 38 may be changed over from a contact point a which is kept normally in closed condition or made to close and with the control lever 10 being at the D or R range, to a normally open contact point b to cut off the current to the electromagnetic solenoid 20, and as a result the changing over of the coupling-preventing mechanism 16 to its rest condition can be effected.

It is apparent of course that the change-over mechanism 37 may also be so arranged as to be operable by a control means other than the control lever 10. In the illustrated embodiment also, there is additionally provided a throttle valve opening mechanism or means 39 arranged to be moved with the change-over mechanism 37 so that the degree of opening of the throttle valve 15 may be slightly increased by a predetermined amount from its normal idle position by the means 39 when the change-over mechanism 37 is changed over to its rest condition, that is, when the changeover switch 38 is changed over to the normally open contact point b.

To describe this more in detail, the opening mechanism 39 comprises a vacuum-operated, diaphragm means 40 coupled to the throttle valve 15 and an electromagnetic change-over valve 43 which causes a pressure chamber 41 for control of the diaphragm means 40 to communicate selectively with the atmosphere or with a negative pressure taking out port 42 provided in the neighborhood of the valve 15. An operation solenoid 44 for operating the change-over valve 43 is connected to the normally open contact point b of the above-mentioned changeover switch 38. Accordingly, when the switch 38 is changed over to the normally open contact point b, the operation solenoid 44 is energized and the change-over valve 43 is operated to change over, so that the pressure chamber 41 is connected to the negative pressure taking out port 42. As a result, the amount of opening of the throttle valve 15 is slightly increased by a predetermined amount by means of the diaphragm means 40. Referring to the drawings, a power switch 45 arranged to move with a key switch can be provided.

Now, the operation of the apparatus will be explained as follows:-

If the operation lever 10 is changed over to the D or R range during the time when the engine is idling with the throttle valve 15 being closed to have an idling position, the hydraulic pressure oil is supplied to the oil supply passage 11a through the oil pressure control means 11. On this occasion, the coupling-preventing mechanism 16 is in its operable state, and consequently the same is operated in such a manner as described above, by the output signal from the idle open degree detector 23. Thus, the pressure oil is leaked into the drain passage 18. This prevents the first speed clutch 9-1 from coupling, so that no creep occurs and substantially the same idling speed of the engine obtains substantially the same as the idling speed thereof caused when said control lever 10 is set in the N range.

When, from the above condition, the throttle pedal 22 is pressed to start the vehicle, the idle detector 23 stops generating an output signal therefrom, so that the coupling-preventing mechanism 16 is stopped in operation. Whereupon the first speed clutch 9-1 is supplied with the pressure oil and is coupled. Thereby the output torque of the engine 1 is transmitted to the driving wheels 2 for starting the vehicle.

When the control lever 10 is shifted to the L range, the coupling-preventing mechanism 16 is changed over, by means of the change-over mechanism 37, to the rest state at which it is inoperable, so that the coupling-preventing mechanism 16 cannot be operated even during idling of the engine. In this condition the first speed clutch 9-1 is coupled, so that the creep can be conveniently used for starting the vehicle on a slope or advancing the same a little from the stopped condition to narrow the distance between the same and the preceeding vehicle.

On this occasion, the throttle valve 15 is slightly advanced a predetermined amount from a predetermined idle position by a throttle opening mechanism 39. In this manner, the possible lowering in idle rotation speed that would otherwise be caused by a load increase resulting from the creep can be prevented.

If the throttle valve opening mechanism 39 is not provided, a vibration of the engine mount resulting from lowering in idling rotation speed caused by the creep can occur. However, the creep is utilized, as desired, temporarily only in such an occasion as starting of the vehicle on a sloping road, or the like as mentioned above. Therefore, even if the vibration or the like due to the creep occurs, the same is of such a temporary nature that is not an absolutely impermissible one, so that the adjusting mechanism 39 may be omitted, if an occasion demands.

Though the construction and the operation of this invention have been explained as above in regard to the illustrated embodiments, it should be understood that the coupling-preventing mechanism 16, the change-over mechanism 37 and the throttle valve opening mechanism 39 are not limited to the foregoing electrically operated and controlled ones but can be changed into mechanically operated and controlled ones. It should also be understood that the present invention can be applied also to a semi-automatic type transmission apparatus in which the transmission mechanism 4 is manually shifted by the control lever 10.

Although the L range has been described, in regard to the foregoing embodiments, as an automatic speed-change range covering the first and second speeds, the same may be one covering the second speed only. The construction for preventing creep has been explained also in regard to the R range has been explained, but such a modification can be considered that the contact point a is so arranged as not to be closed in the R range in such a transmission apparatus that creep is desired to be utilized.

Thus, according to this invention, the coupling-preventing mechanism is changeable over freely by the change-over mechanism from its operative state to its rest state at which it is inoperable, so that it is advantageous in that creep can be properly utilized as an occasion demands. Furthermore, according to the second feature of this invention, the degree of opening of the throttle valve is a little increased by a predetermined amount from a predetermined idling position when creep is desired to be utilized, so that lowering in an idle rotation speed caused by a load increase can be prevented and accordingly the abovementioned inconveniences caused by lowering in rotation speed can be effectively removed.

What is claimed is:

1. A control mechanism for a transmission of a vehicle having an internal combustion engine, the transmission including a torque convertor, a coupling member, a gear-train, and an operation lever having a neutral position and at least three other positions, the torque convertor, the gear-train, and the coupling member being interposed in a system line for transmitting output torque of the engine to a driving wheel of the vehicle, the operation lever being arranged to operate the coupling member to connect the torque convertor to the gear-train by being moved from the neutral position to one of the other positions; the control mechanism including coupling-preventing means operatively associated with the coupling member for preventing coupling when a throttle valve of the engine is in an idling position and the operation lever is moved from the neutral position to one of the other positions, and change-over means associated with the coupling-preventing means for selectively changing-over the coupling-preventing means from an operative state preventing coupling to a rest state permitting coupling whereupon the coupling member connects the torque convertor to the gear-train even though the throttle valve is in an idling position.

2. The control mechanism of claim 1, wherein the change-over means is operatively associated with the operation lever at least one selected position of said three other positions whereupon movement of the operation lever from the neutral position to said at least one selected position changes over the coupling-preventing means to the rest state even though the throttle valve is in an idling position.

3. The control mechanism of claim 2, wherein the change-over means is operatively associated with the operation lever at two selected positions of said three other positions.

4. The control mechanism of any one of claims 1, 2, or 3, further comprising means operative when said change-over means changes over the coupling-preventing means to the rest state for opening the throttle valve a predetermined amount from the idling position.

5. The control mechanism of claim 4 wherein the coupling member is operated by a predetermined minimum of hydraulic pressure; said coupling-preventing means includes an electrical power source, means for generating a signal when the throttle valve is in the idling position, solenoid means for reducing the hydraulic pressure to the coupling member below the predetermined minimum and contact means electrically connecting the power source to the solenoid means when said generating means produces a signal; and said change-over means comprises a switch having two positions electrically interposed between said contact means and said solenoid means and operatively connected to said operation lever, one of the switch positions electrically connecting the contact means to the solenoid means to establish the operative state of the coupling-preventing means, the other switch position disconnecting the contact means and the solenoid means to establish the rest state of the coupling-preventing means.

6. The control mechanism of claim 5, wherein said means for opening the throttle valve comprises vacuum-operated means mechanically linked to said throttle valve for opening the throttle valve the predetermined amount, valve means connected between a source of vacuum and said vacuum-operated means for applying vacuum to open the throttle valve, further solenoid means connected to said valve means for operating the valve means upon being connected to a source of electrical power, and electrical connection means between said further solenoid means and said other position of said switch whereby when said switch is in said other position, said further solenoid means operates the valve means for applying vaccum to said means for opening the throttle valve the predetermined amount.

* * * * *